(12) United States Patent
DiSalvo

(10) Patent No.: US 7,502,212 B2
(45) Date of Patent: Mar. 10, 2009

(54) IDCI WITH RESET LOCKOUT AND INDEPENDENT TRIP

(75) Inventor: Nicholas L. DiSalvo, Levittown, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 213 days.

(21) Appl. No.: 11/301,969

(22) Filed: Dec. 12, 2005

(65) Prior Publication Data

US 2006/0132266 A1    Jun. 22, 2006

Related U.S. Application Data

(63) Continuation of application No. 10/779,211, filed on Feb. 13, 2004, now Pat. No. 6,975,192, which is a continuation of application No. 09/813,683, filed on Mar. 21, 2001, now Pat. No. 6,693,779, which is a continuation-in-part of application No. 09/379,138, filed on Aug. 20, 1999, now Pat. No. 6,246,558, which is a continuation-in-part of application No. 09/369,759, filed on Aug. 6, 1999, now Pat. No. 6,282,070, which is a continuation-in-part of application No. 09/138,955, filed on Aug. 24, 1998, now Pat. No. 6,040,967.

(51) Int. Cl.
*H01H 9/00* (2006.01)
*H02H 3/00* (2006.01)

(52) U.S. Cl. .............................. 361/42; 335/18
(58) Field of Classification Search ................ 335/18, 335/21, 24, 26, 202; 361/42–50
See application file for complete search history.

(56) References Cited

U.S. PATENT DOCUMENTS

| | | | | | |
|---|---|---|---|---|---|
| 4,851,951 | A | * | 7/1989 | Foster, Jr. ................. | 361/50 |
| 4,967,308 | A | * | 10/1990 | Morse ..................... | 361/42 |
| 4,979,070 | A | * | 12/1990 | Bodkin .................... | 361/42 |
| 5,148,344 | A | * | 9/1992 | Rao et al. ................ | 361/42 |
| 5,202,662 | A | * | 4/1993 | Bienwald et al. .......... | 335/18 |
| 5,661,623 | A | * | 8/1997 | McDonald et al. ......... | 361/42 |
| 5,694,280 | A | * | 12/1997 | Zhou ....................... | 361/45 |
| 5,815,363 | A | * | 9/1998 | Chu ........................ | 361/154 |
| 5,844,765 | A | * | 12/1998 | Kato et al. ................ | 361/115 |
| 6,437,700 | B1 | * | 8/2002 | Herzfeld et al. ........... | 340/650 |
| D462,660 | S | * | 9/2002 | Huang et al. ............ | D13/139.3 |
| 6,580,344 | B2 | * | 6/2003 | Li ........................... | 335/18 |
| 6,693,779 | B2 | * | 2/2004 | DiSalvo ................... | 361/42 |
| 2002/0003686 | A1 | * | 1/2002 | Disalvo .................... | 361/42 |

* cited by examiner

*Primary Examiner*—Ramon M Barrera
(74) *Attorney, Agent, or Firm*—Paul J. Sutton

(57) ABSTRACT

Resettable circuit interrupting devices, such as an IDCI, are provided having a reset lockout and independent trip.

1 Claim, 13 Drawing Sheets

IDCI WITH RESET LOCKOUT AND INDEPENDENT TRIP

CROSS REFERENCE TO RELATED APPLICATIONS

This application is a continuation of application Ser. No. 10/779,211 filed Feb. 13, 2004, now U.S. Pat. No. 6,975,192; which is a continuation of application Ser. No. 09/813,683 filed Mar. 21, 2001, now U.S. Pat. No. 6,693,779; which is a continuation-in-part of application Ser. No. 09/379,138 filed on Aug. 20, 1999, now U.S. Pat. No. 6,246,558; which is a continuation-in-part of application Ser. No. 09/369,759 filed on Aug. 6, 1999, now U.S. Pat. No. 6,282,070; which is a continuation-in-part of application Ser. No. 09/138,955 filed Aug. 24, 1998, now U.S. Pat. No. 6,040,967.

This application is related to commonly owned application Serial No. filed Mar. 20, 2001, entitled Reset Lockout for Sliding Latch GFCI, by inventors Frantz Germain, Stephen Stewart, David Herzfeld, Steven Campolo, Nicholas DiSalvo and William R. Ziegler, having Ser. No. 09/812,875 which is a continuation-in-part of application Ser. No. 09/688,481 filed Oct. 16, 2000, all of which are incorporated herein in their entirety by reference.

This application is related to commonly owned application Serial No. filed Dec. 6, 2004, entitled Reset Lockout Mechanism and Independent Trip Mechanism for Center Latch Circuit Interrupting Device, by inventors Frantz Germain, Steven Stewart, Roger Bradley, David Chan, Nicholas L. DiSalvo and William R. Ziegler, having Ser. No. 11/005,108, herein incorporated by reference.

This application is related to commonly owned application Ser. No. 09/379,140 filed Aug. 20, 1999, which is a continuation-in-part of application Ser. No. 09/369,759 filed Aug. 6, 1999, which is a continuation-in-part of application Ser. No. 09/138,955, filed Aug. 24, 1998, now U.S. Pat. No. 6,040,967, all of which are incorporated herein in their entirety by reference.

BACKGROUND

1. Field

The present application is directed to resettable circuit interrupting devices without limitation ground fault circuit interrupters (GFCI's), arc fault circuit interrupters (AFCI's), immersion detection circuit interrupters (IDCI's), appliance leakage circuit interrupters (ALCI's), equipment leakage circuit interrupters (ELCI's), circuit breakers, contactors, latching relays and solenoid mechanisms. More particularly, certain embodiments of the present application are directed to IDCIs that include a reset lock out portion capable of preventing the device from resetting under certain circumstances and an independent trip mechanism.

2. Description of the Related Art

Many electrical appliances have an electrical cord having a line side, which is connectable to an electrical power supply, and a load side that is connected to the appliance, which is an electrical load. Certain appliances may be susceptible to immersion in a conductive fluid, which may present a shock hazard. Other fault scenarios may be addressed by other circuit interrupters alone or in combination. Accordingly, the electrical wiring device industry has witnessed an increasing call for circuit breaking devices or systems which are designed to interrupt power to various loads, such as household appliances, consumer electrical products and branch circuits. In particular, appliances utilized in areas that may be wet, such as hair dryers, may be equipped with an IDCI to protect against immersion hazards. Such products have been marketed by companies under brand names including Conair

SUMMARY

The present application relates to a resettable circuit interrupting devices.

In one embodiment, the circuit interrupting device includes a user interface. Before the device is used, it is tripped. The user must then use the user interface to enable a test actuator to initiate a test of the device. If the test passes, the device will reset. Otherwise, the device will be locked out. In another embodiment, the device may be tripped by a user interface to a mechanical trip mechanism.

One embodiment for the circuit interrupting portion uses an electro-mechanical circuit interrupter to cause electrical discontinuity in at least one of the phase and neutral conductive paths of the device, and sensing circuitry to sense the occurrence of a predetermined condition. The mechanical trip arm may be configured to facilitate mechanical breaking of electrical continuity in the phase and/or neutral conductive paths, if the trip actuator is actuated. Furthermore, the mechanical trip arm or level may be configured so that it will not be operable to reset the device.

BRIEF DESCRIPTION OF THE DRAWINGS

Preferred embodiments of the present application are described herein with reference to the drawings in which similar elements are given similar reference characters, wherein.

DETAILED DESCRIPTION OF EMBODIMENTS

Figure 1:
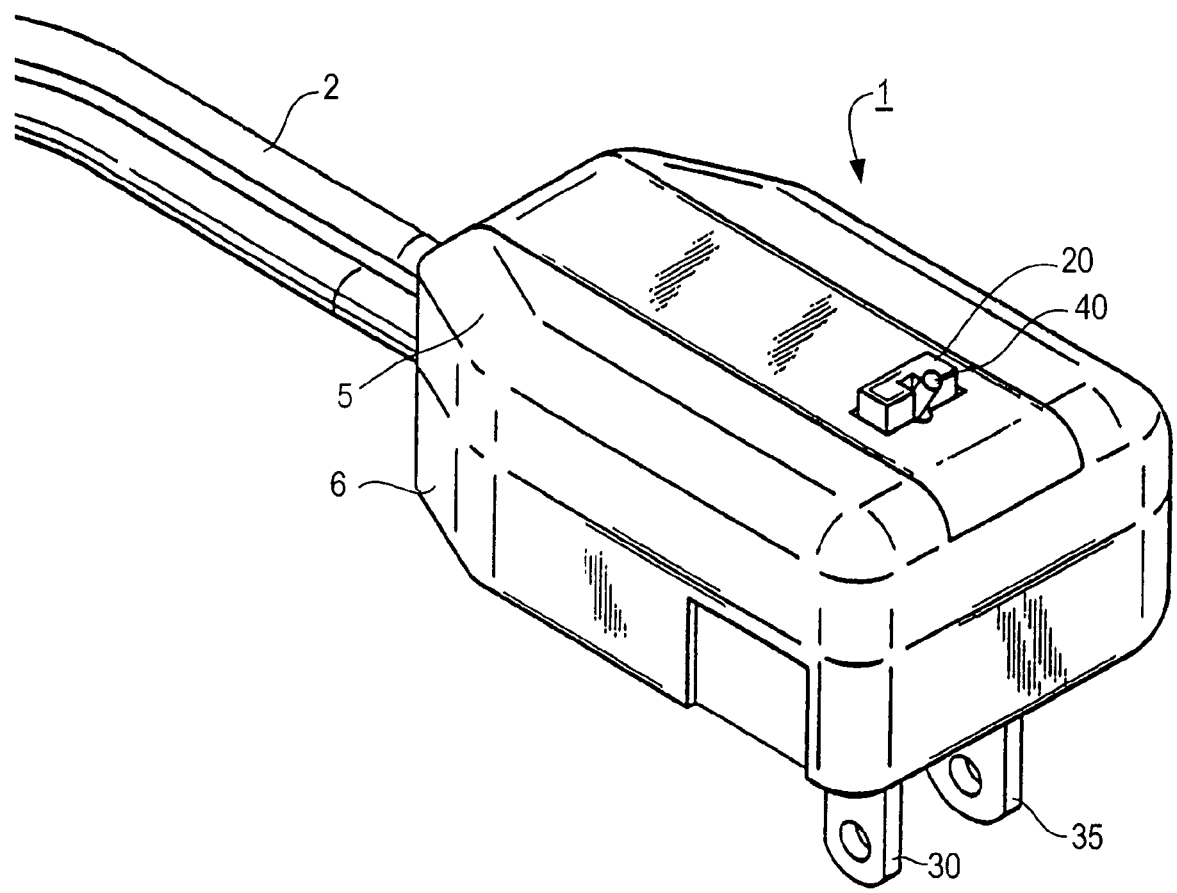
FIG. 1 is a perspective view of one embodiment of as immersion detection circuit interrupting device IDCI according to the present application.

The present application contemplates various types of circuit interrupting devices that are capable of breaking at least one conductive path. The conductive path is typically divided between a line side that connects to supplied electrical power and a load side that connects to one or more loads such as an appliance. For the purpose of the present application, the structure or mechanisms used in the circuit interrupting devices, shown in the drawings and described hereinbelow, are incorporated into a IDCI device suitable for installation in an appliance or an appliance power cord. However, the mechanisms according to the present application can be included in any of the various devices in the family of resettable circuit interrupting devices.

A common IDCI utilizes a single switch configured as a dual pole single throw (DPST) switch. In this embodiment of the present invention, S1 comprises a dual pole dual throw (DPDT) center off switch. A typical IDCI may not have a test circuit. In this embodiment, R4 is used to create a test circuit. A typical IDCI may have a solenoid plunger that is not isolated from the latch. In this embodiment, latch 70 is isolated from plunger 86 by insulator 74 and the plunger 86 may be shortened to make room for the insulator. A typical IDCI may not have a test feature, as described below, this embodiment uses additional contacts and arms to provide a line powered test of the device without power being applied to the load.

As can be appreciated, other embodiments including those having features of the commonly owned applications incorporated by reference above are anticipated.

Turning now to FIG. 1, a representative IDCI 1 is shown configured with an IDCI attached at the end of an appliance power cord 2. A source of power may be connected to line side prongs 30, 35. The IDCI of this embodiment has two user interfaces, a reset button 20 and independent trip lever 40.

Figure 2:
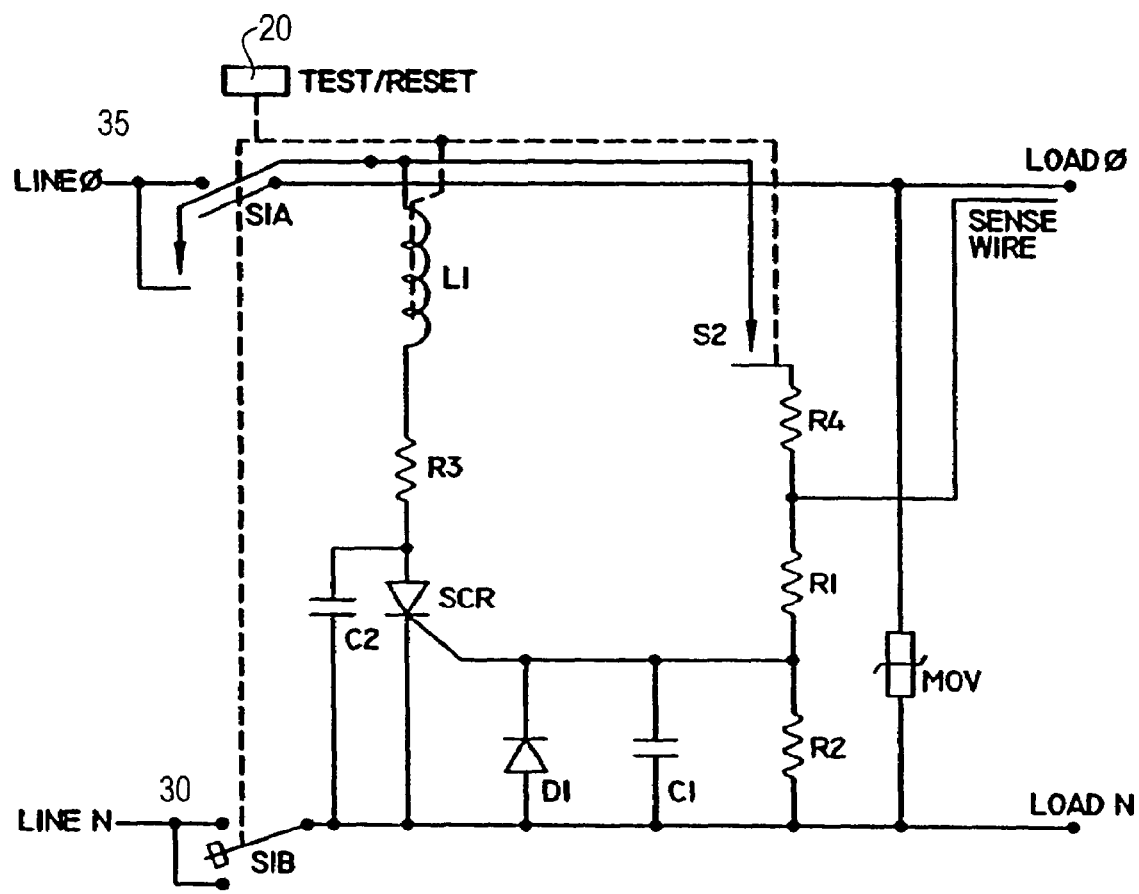
FIG. 2 is a schematic diagram representation of one embodiment of an IDCI according to the present application.

FIG. 2 is a schematic diagram representation of one embodiment of an IDCI according to the present application. As can be appreciated many physical configurations may be utilized in accordance with the teachings of the present invention. S1 is a dual pole dual throw center off switch used for a reset with reset lockout protection using an electrical test of the device. Switch S2 and R4 comprise a test circuit that will exercise the sense circuit and coil. Coil L1 is a solenoid coil that will trigger a trip of the device. A sense wire is positioned to detect immersion and connected to a sense circuit R1, R2, C1, D1 that will trigger SCR to fire coil L1 when a fault is detected.

Figure 2A:
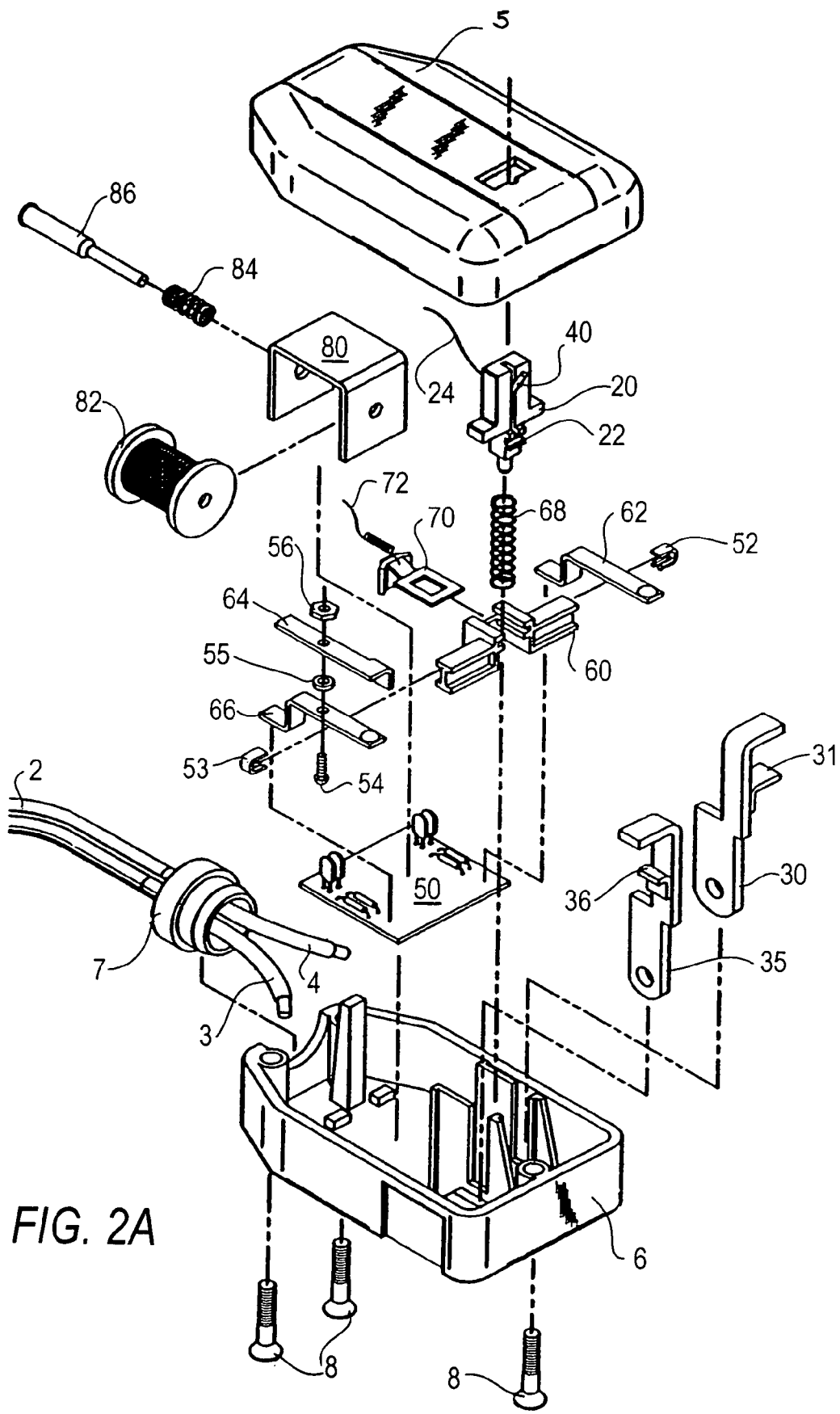
FIG. 2a is an exploded perspective view of components of the IDCI.

With reference to FIG. 2a, an exploded view of the IDCI of the present embodiment is shown. A top cover 5 and bottom cover 6 are provided with fasteners 8. A power cord 2 having phase and neutral wires 4,3 are provided. A strain relief 7 is provided. A printed circuit board (PCB) 50 is connected to the bottom cover. A solenoid 80 having coil 82, plunger 86 and plunger bias spring 84 is connected to the PCB 50. A trip latch 70 is biased by latch spring 72 and mates with catch 60. Reset button 20 has a test contact 22 and is biased by spring 68. Test contact 22 is connected to test wire 24 that attaches to test resistor R4 (not shown). Plugs 35, 30 have contacts 36, 31 respectively attached. Movable arms 66,62 are connected to the power cord. Arm 64 is attached to movable arm 66 using fastener 54, 55, 56. Clamp 52 is connected to catch 60. A trip arm 40 is pivotally connected in reset button 20.

Figure 2B:
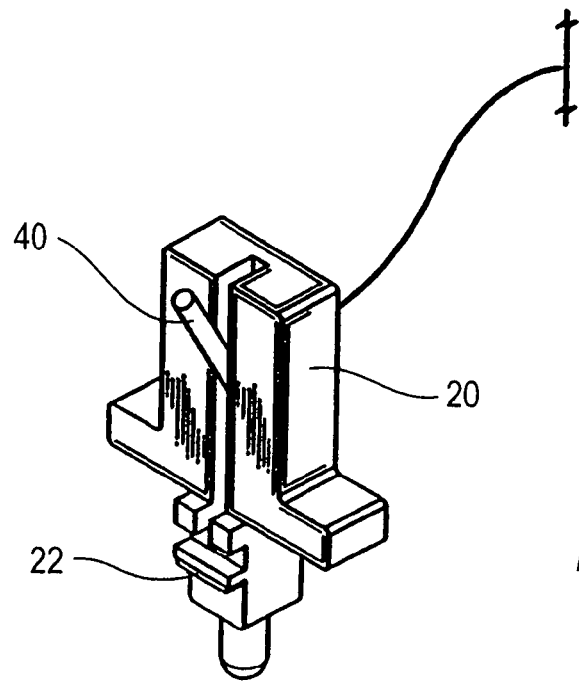
FIG. 2b is a perspective view of a reset button and trip arm of the IDCI.

With reference to FIG. 2b, reset button 20 is shown with trip arm 40 and test contact 22.

Figure 2C:
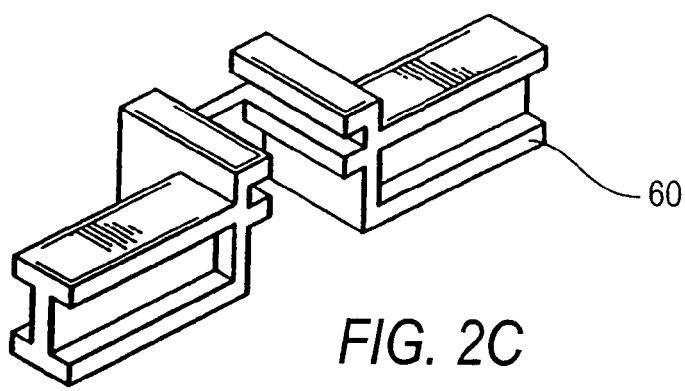
FIG. 2c is a perspective view of a catch of the IDCI.

With reference to FIG. 2c, a catch 60 is shown. The latch 70 is slidably connected to the catch 60 and the reset button 20 may interact with the latch 70 inside the catch 60.

Figure 2D:
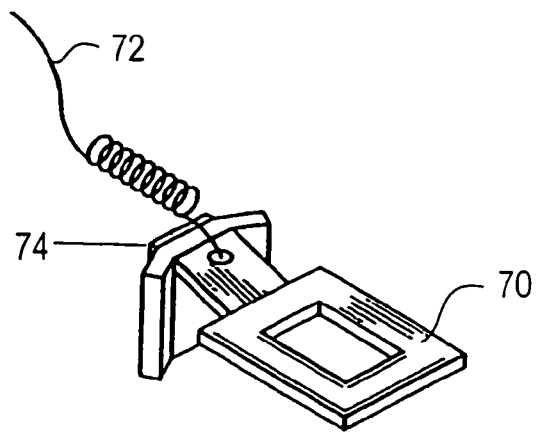
FIG. 2d is a perspective view of a latch and latch spring of the IDCI.

With reference to FIG. 2d, latch 70 is shown with latch spring 72 and an insulator 74 added to insulate the plunger 86 from the latch 70.

Figure 3:
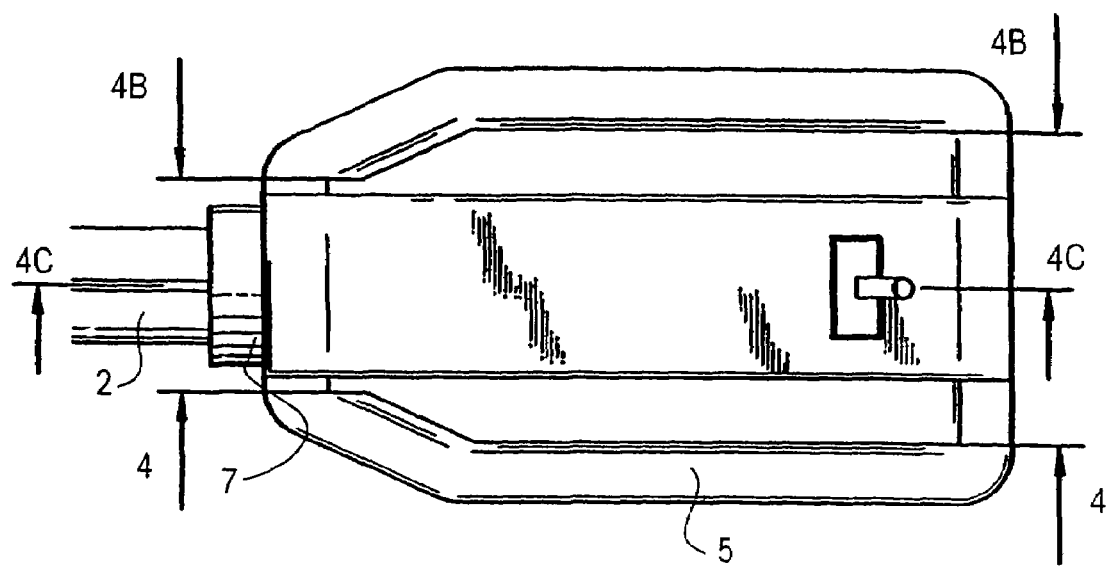
FIG. 3 is a top view of an IDCI according to the present application.

Referring to FIG. 3, a top view of the IDCI is shown.

Figure 4:
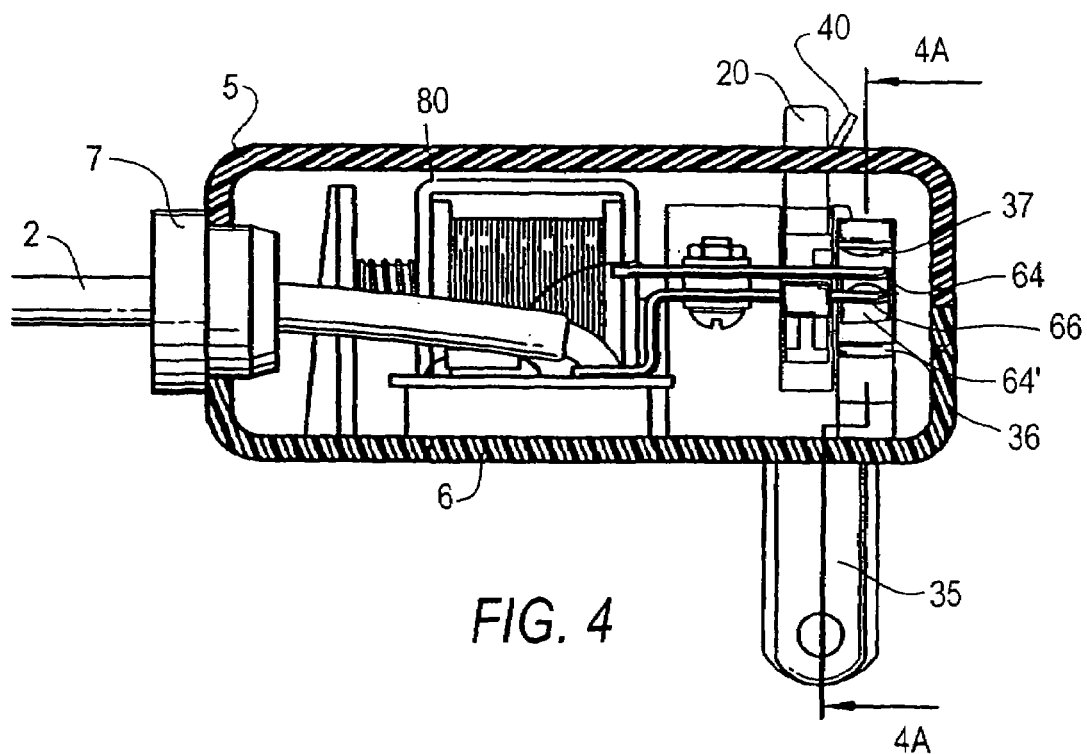
FIG. 4 is a partial cutaway perspective view of the IDCI along line 4 shown in a tripped state.
Figure 4A:
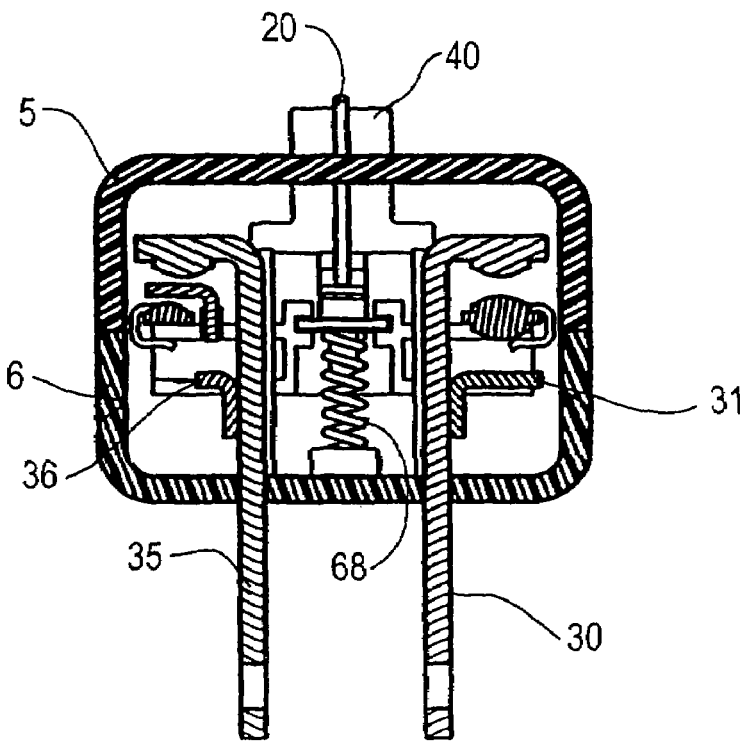
FIG. 4a is a partial cutaway perspective view of the IDCI along line 4a shown in a tripped state.
Figure 4B:
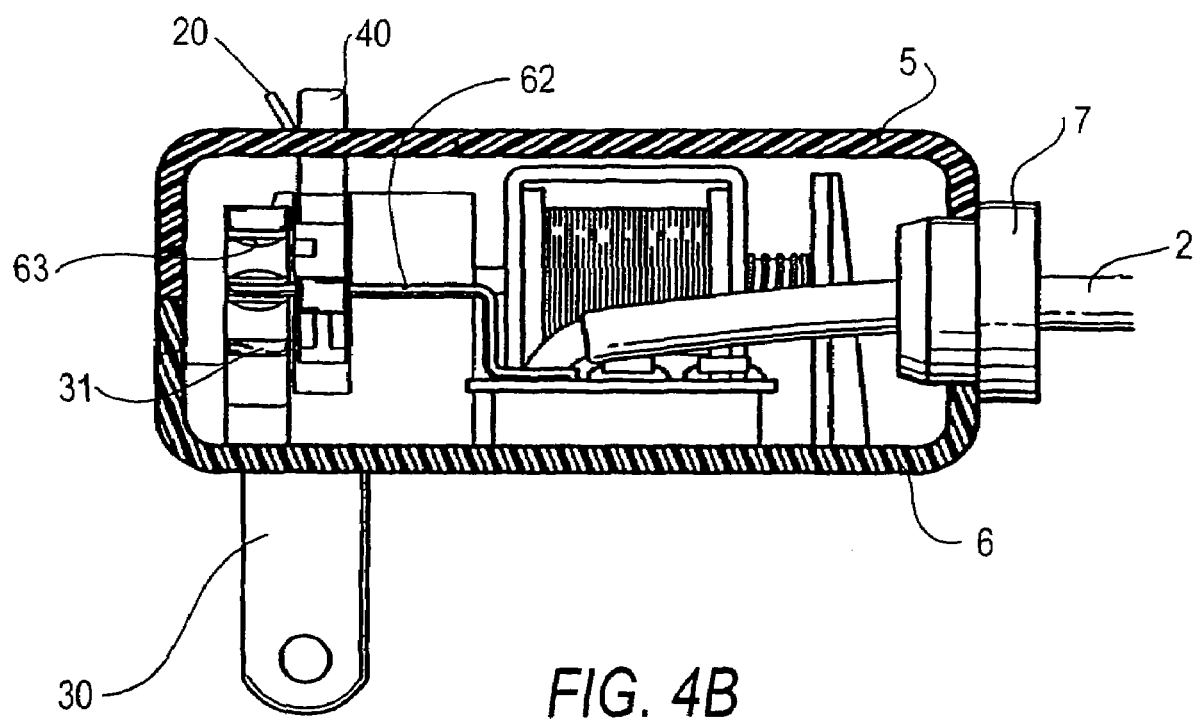
FIG. 4b is a partial cutaway perspective view of the IDCI along line 4b shown in a tripped state.
Figure 4C:
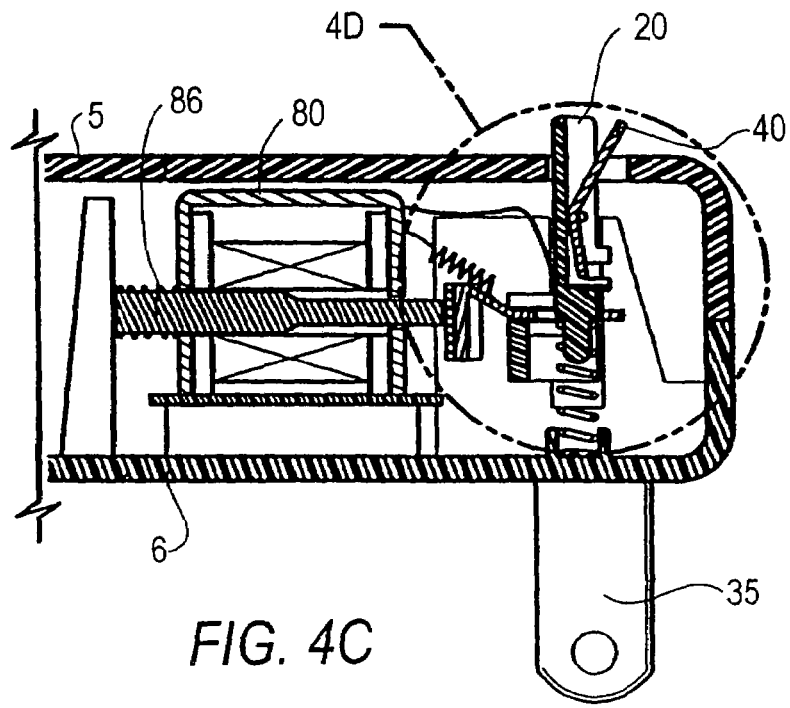
FIG. 4c is a partial cutaway perspective view of the IDCI along line 4c shown in a tripped state.
Figure 4D:
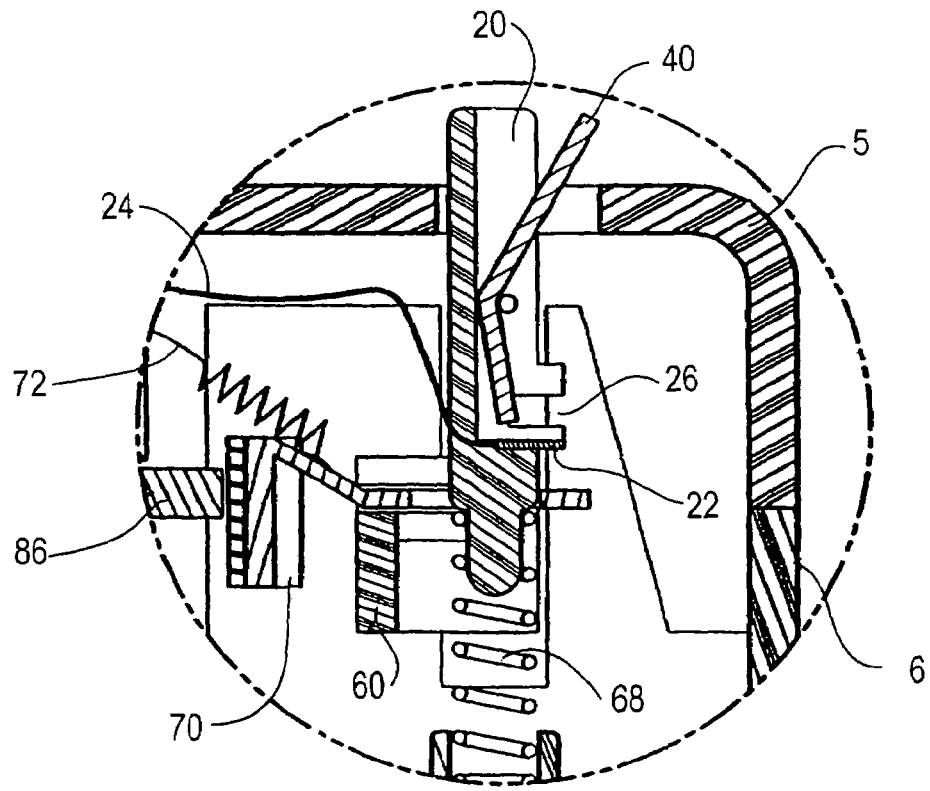
FIG. 4d is a detail view of section 4d from FIG. 4c.

With reference to FIGS. 4, 4a, 4b, 4c, and 4d, the IDCI is shown in a tripped state. As shown in FIG. 4, the movable arm 66 and the connected arm 64 are not in contact with contact 37 of prong 35 such that the line circuit is broken. As shown in FIG. 4b, the other movable arm 62 is also open and not connected to contact 63 of prong 30. As can be seen in FIG. 4a, the reset button 40 is in a raised state as biased by spring 68. As shown in FIGS. 4c and 4d, the latch 70 has moved right, releasing reset button 20 when it is moved from reset button catch 26.

Figure 5:
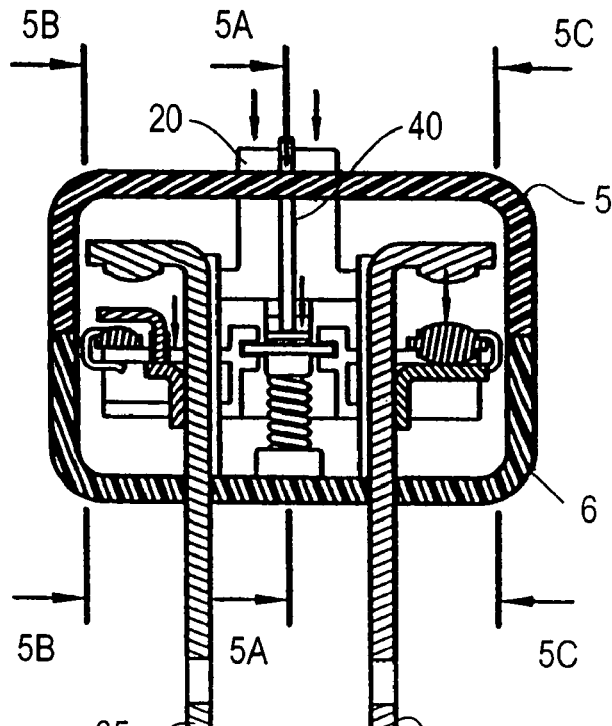
FIG. 5 is a partial cutaway front view of the IDCI in a reset lockout state.
Figure 5A:
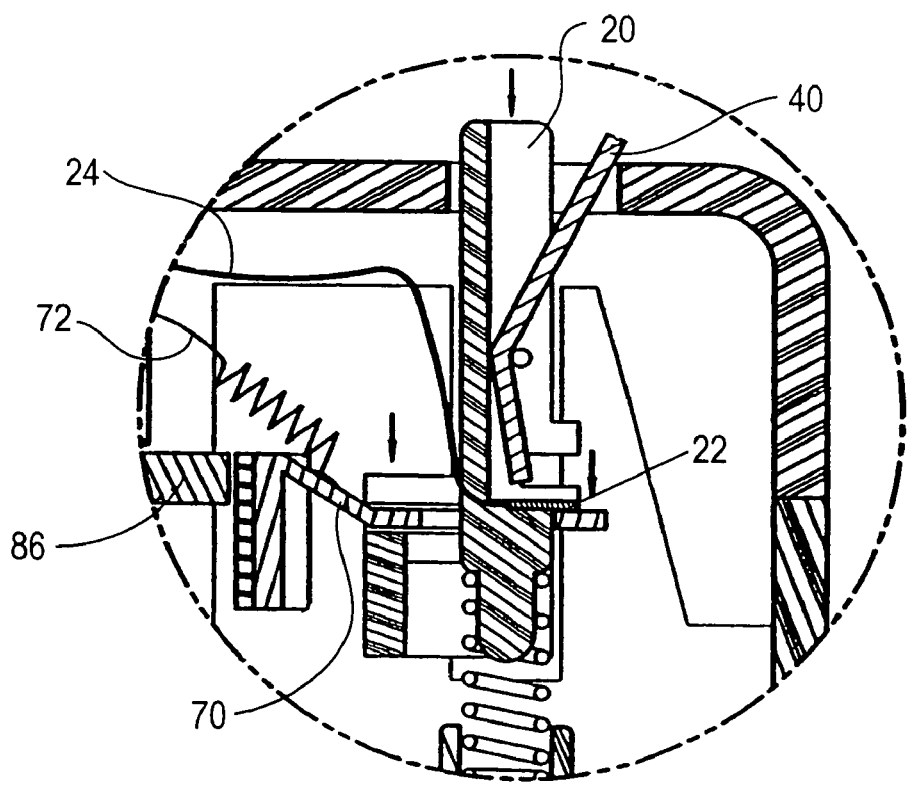
FIG. 5a is a detail partial section perspective view of the IDCI along line 5a in a reset lockout state.

With reference to FIGS. 5, 5a, 5b, and 5c the device is shown in a reset locked out state. As shown in FIG. 5, the reset button is depressed. As shown in FIG. 5a, test contact 22 comes in contact with latch 70. A test circuit is closed through wire 24 and resistor R4 (not shown). As can be appreciated, if the solenoid coil 82 does not fire, the reset button will not continue as it is blocked by the latch 70.

Figure 5B:
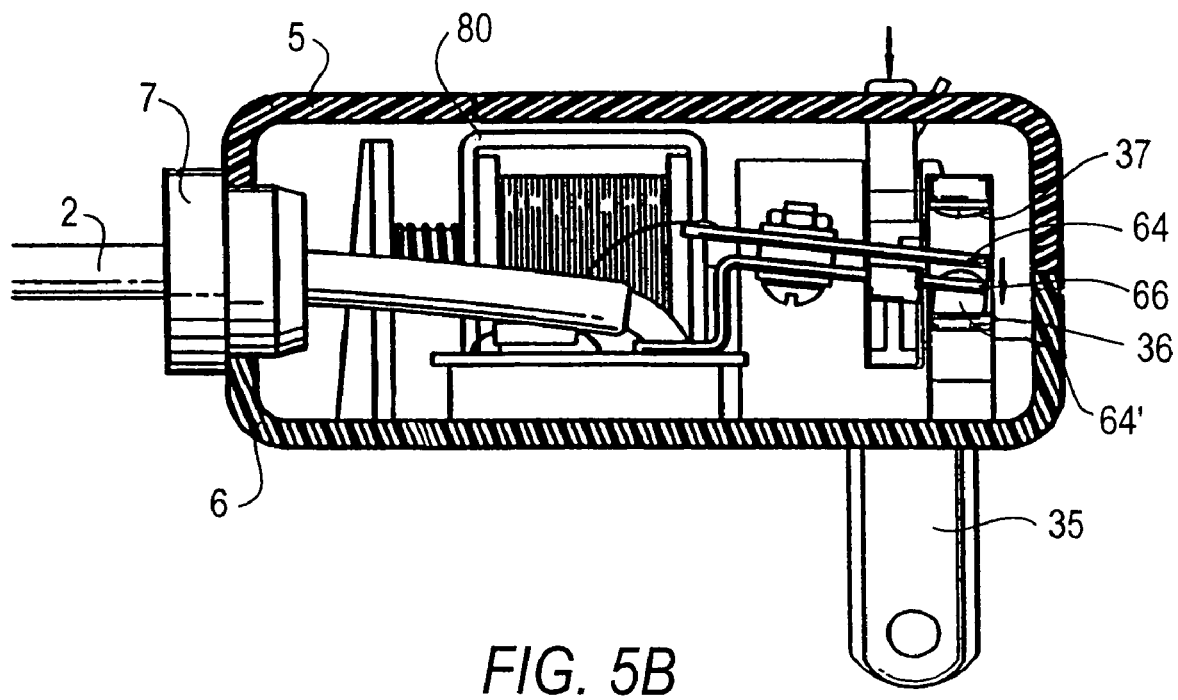
FIG. 5b is a partial cutaway perspective view of the IDCI along line 5b shown in a reset lockout state.
Figure 5C:
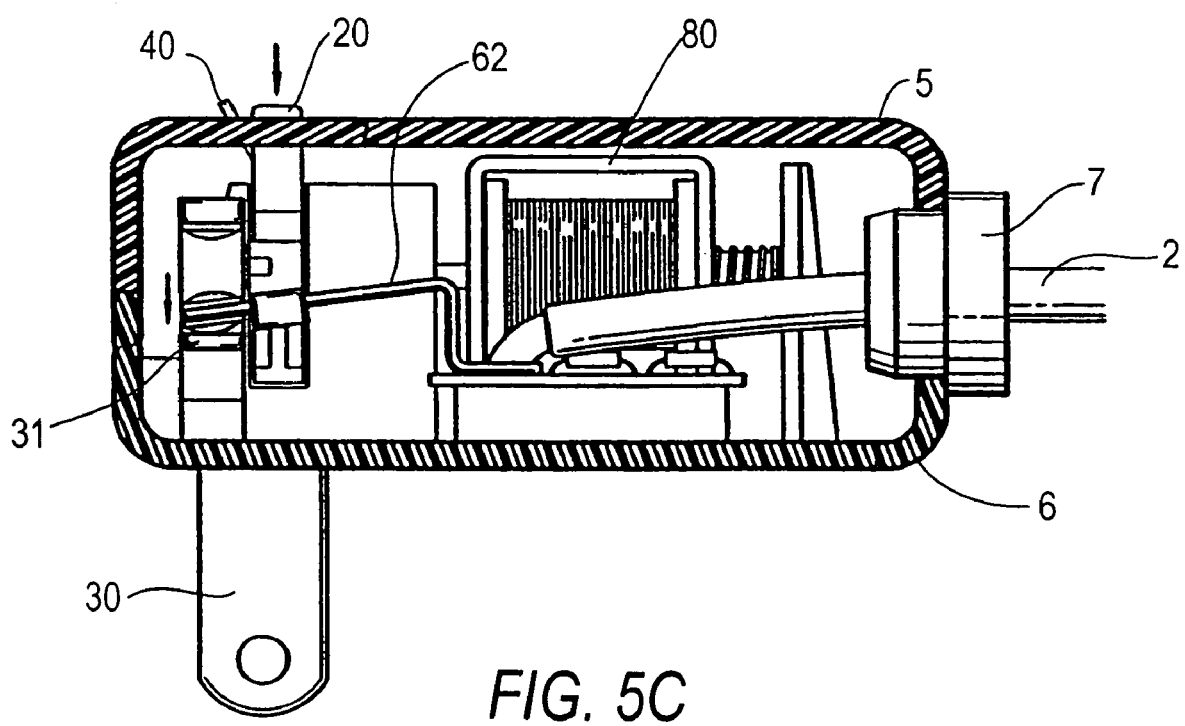
FIG. 5c is a partial cutaway perspective view of the IDCI along line 5c shown in a reset lockout state.

As shown in FIG. 5c, depressing the reset button will move switch S1B to connect the line neutral to the load neutral conductors using connector contact 31 and arm 62. As shown in FIG. 5b, the arm 64 and its extension 64' connect to the phase prong 36 without energizing movable arm 66 that is isolated from the appliance plug phase wire 3. In this way, the IDCI circuit may be powered without powering the appliance.

As can be appreciated, the line phase is connected to the test circuit, but not connected to the load phase during the test, as shown in FIG. 2.

Figure 6:
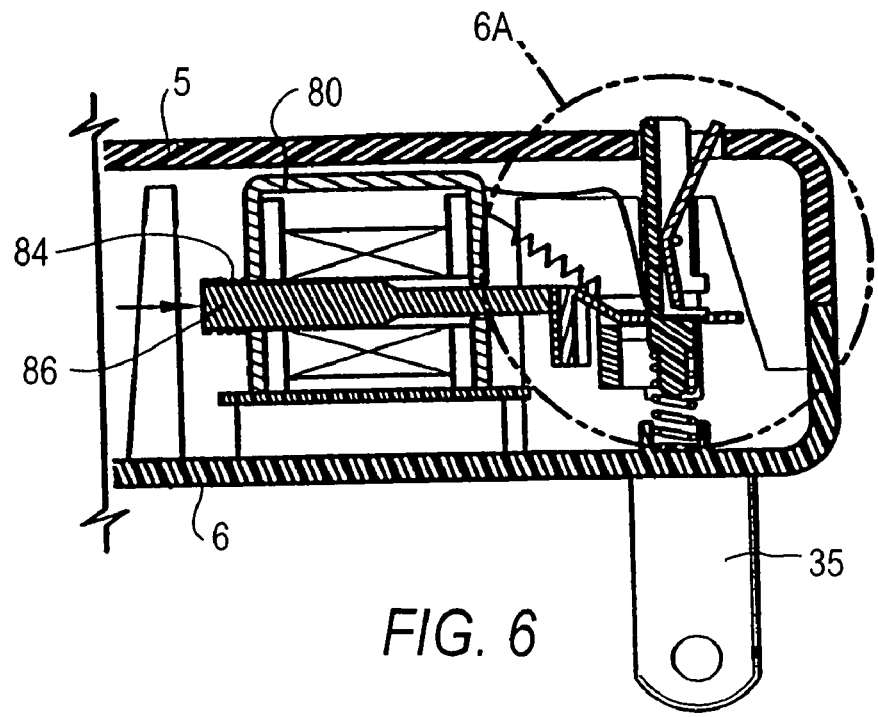
FIG. 6 is a partial cutaway perspective view of the IDCI shown in an intermediate state with plunger moving latch.
Figure 6A:
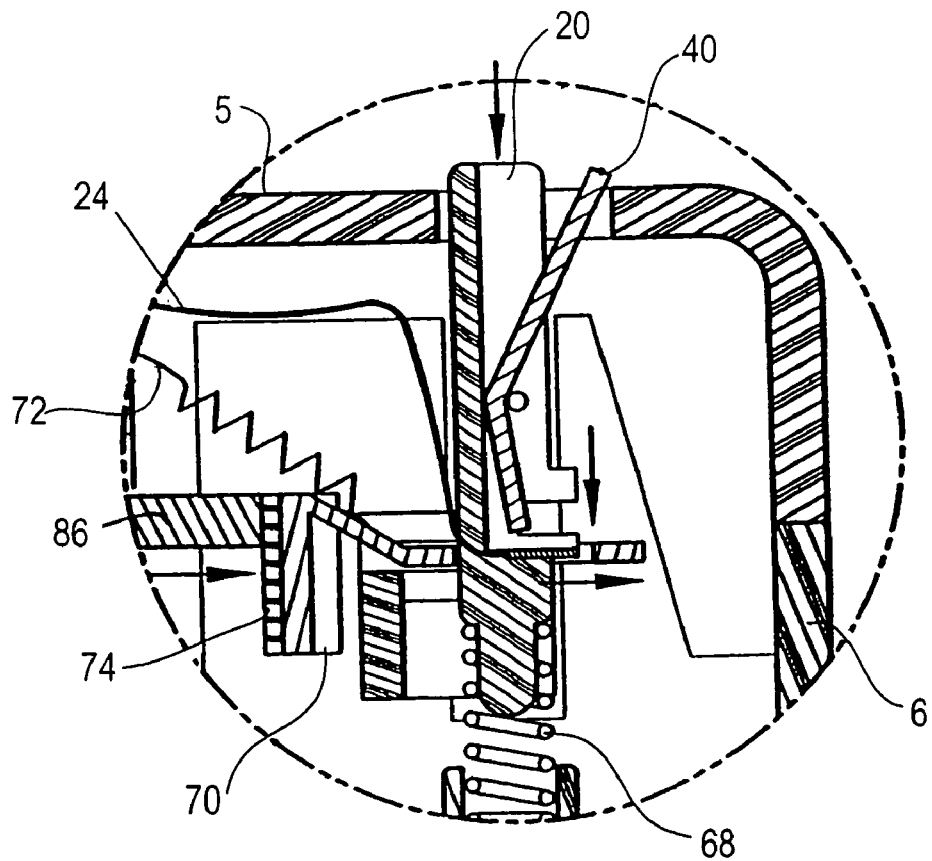
FIG. 6a is a detail view of the IDCI shown in an intermediate state with plunger moving latch.

As shown in FIGS. 6 and 6a, if the test circuit successfully fires the solenoid 80, plunger 86 will strike latch 70 (at insulator 74) and will move to the right and reset button 20 can continue downward such that the IDCI will enter the on state and the reset button will be latched in the catch 60 by the latch 70 when it returns to the left under bias of spring 72.

Figure 7:
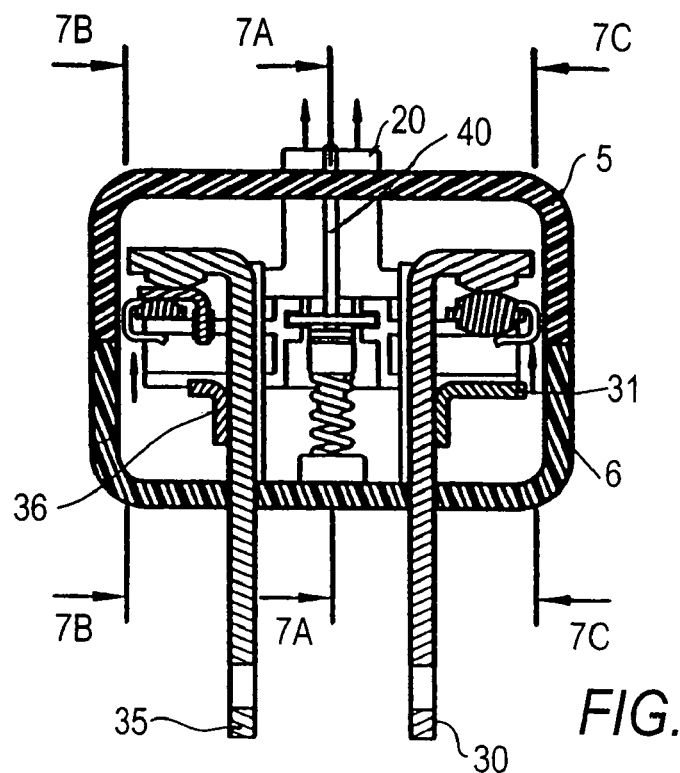
FIG. 7 is a partial cutaway front view of the IDCI in an on state.
Figure 7A:
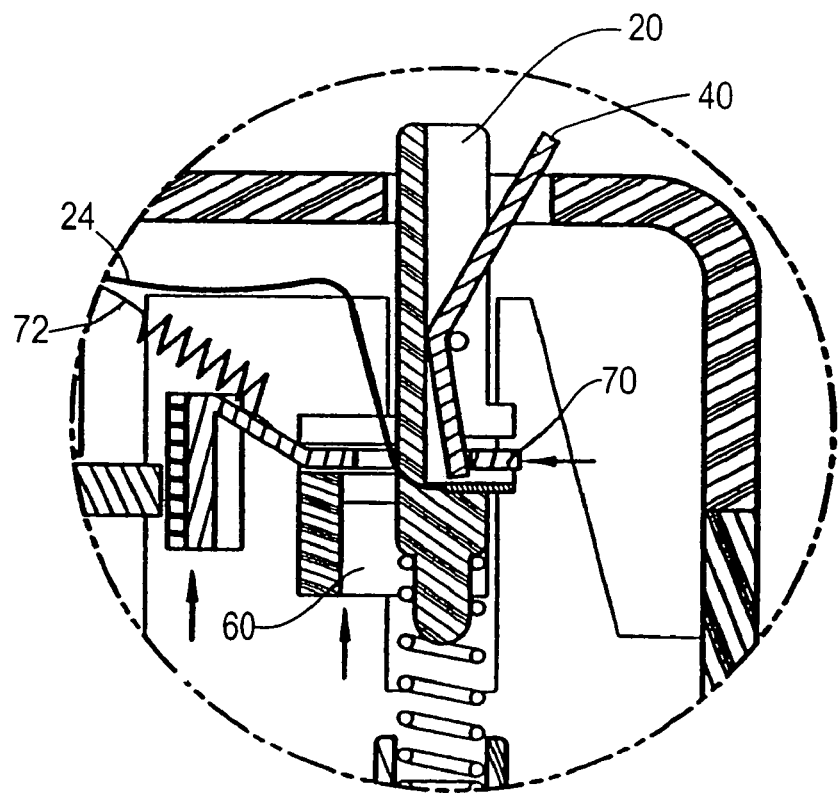
FIG. 7a is a detail partial section perspective view of the IDCI along line 5a in an on state.
Figure 7B:
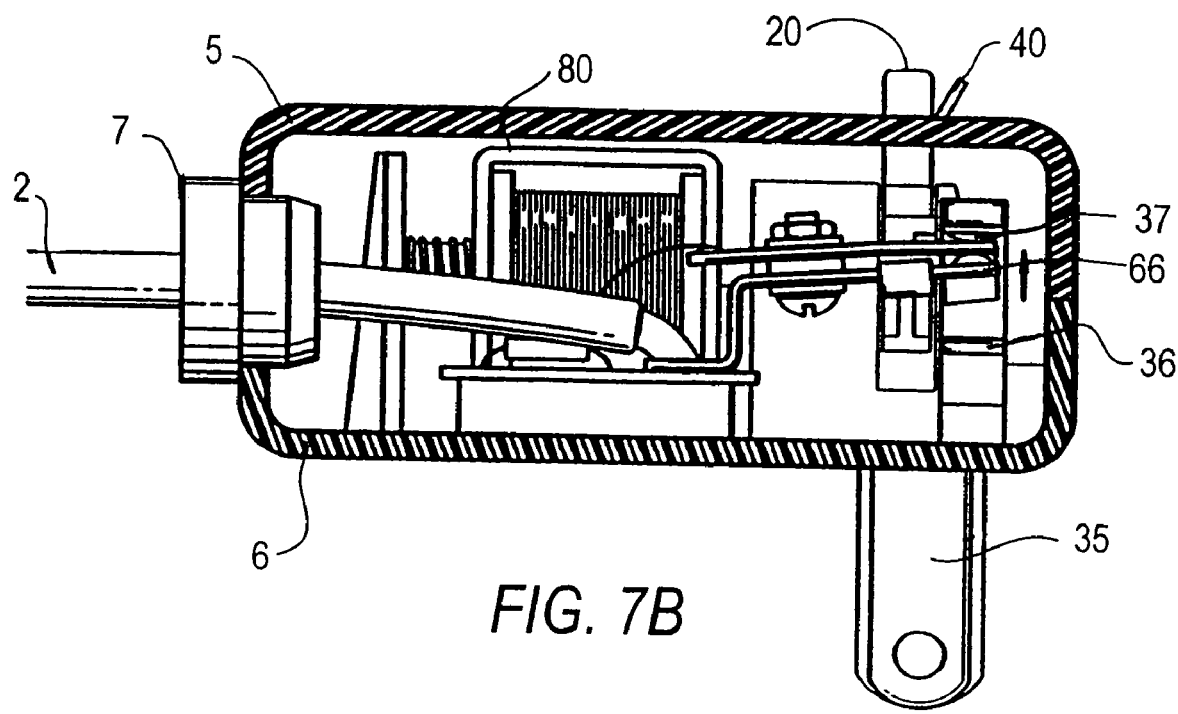
FIG. 7b is a partial cutaway perspective view of the IDCI along line 7b shown in an on state.
Figure 7C:
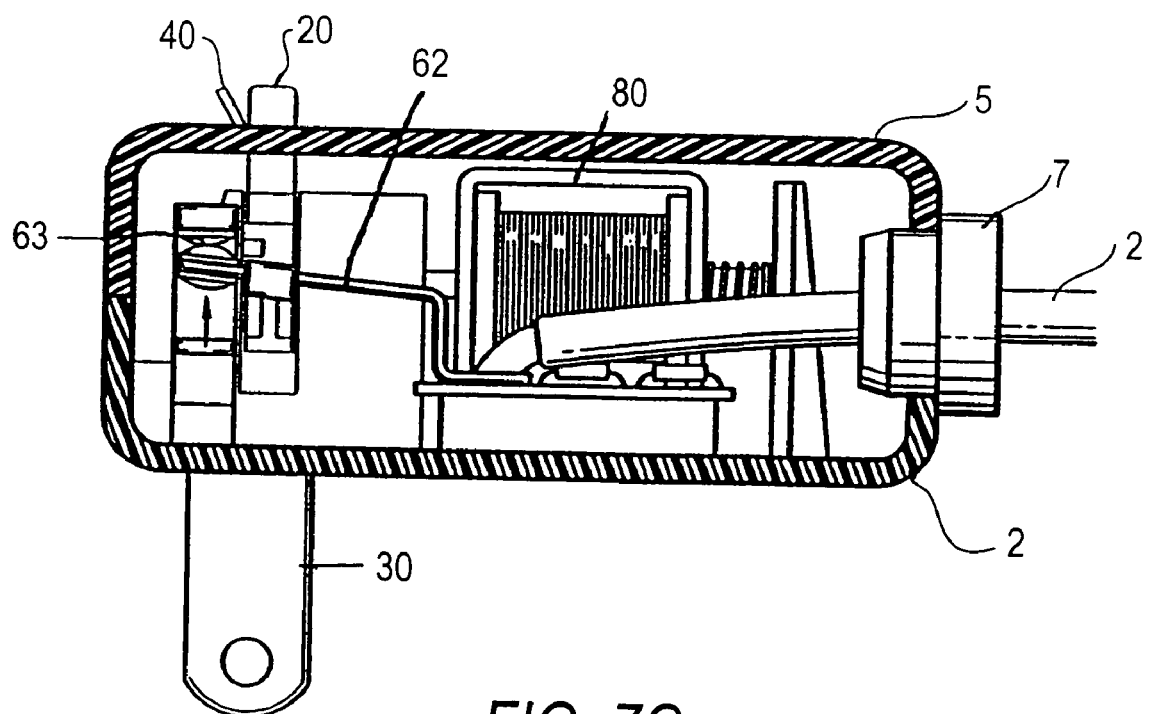
FIG. 7c is a partial cutaway perspective view of the IDCI along line 7c shown in an on state.

As shown in FIGS. 7, 7a, 7b, and 7c, the IDCI is in an on state. As shown in FIG. 7a, the reset button 20 is down in the on state and is latched by latch 70 in button groove 26. As shown in FIGS. 7 and 7b, movable arm 66 is connected to arm 64 that is connected to prong 35. As can be appreciated, the circuit is now complete from the line phase prong 35 to the load phase wire 3. This differs from the situation above when only the IDCI circuit was connected to the phase of the line side. As shown in FIG. 7c, the neutral side is also closed to complete the neutral circuit from the line side to the load wire 4 using contact 63 of prong 30 and movable arm 62.

Figure 8:
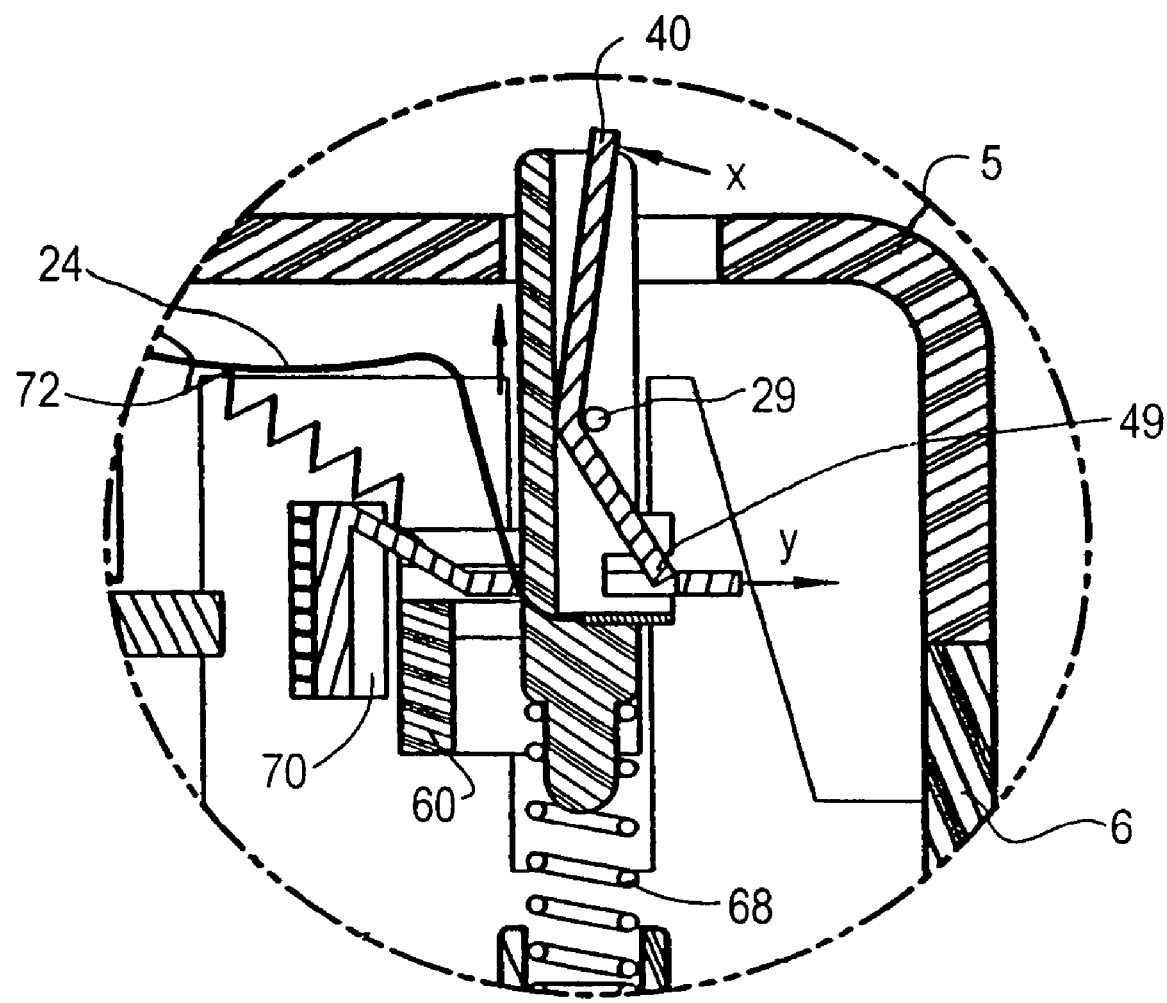
FIG. 8 is a partial cutaway perspective view of the IDCI shown in an intermediate state with manual trip actuator moving latch.

As shown with reference to FIG. 8 an independent trip is described. In this embodiment, the independent trip is a mechanical trip. Trip arm 40 may be activated by a user pressing it in the X direction. The trip arm 40 is pivotally connected to pivot 29 of the reset button 20. As shown, the trip lever bottom 49 will move in the Y direction, and will force latch 70 in the Y direction such that the reset button 40 will be released under bias of spring 68 and the device will be independently tripped without the solenoid 80 firing.

As noted, although the components used during circuit interrupting and device reset operations are electro-mechanical in nature, the present application also contemplates using electrical components, such as solid state switches and supporting circuitry, as well as other types of components capable or making and breaking electrical continuity in the conductive path.

While there have been shown and described and pointed out the fundamental features of the invention, it will be understood that various omissions and substitutions and changes of the form and details of the device described and illustrated and in its operation may be made by those skilled in the art, without departing from the spirit of the invention.

What is claimed:

1. A circuit interrupting device comprising:
    a housing at least partially housing circuit interrupting sensor, a circuit interrupting sense circuit, a line conductor and a load conductor;
    a double pole double throw center off switch selectably activated by a user to power the circuit interrupting sense circuit from the line conductor without powering the user load for testing of the circuit interrupting sense circuit; and
    a reset lockout portion responsive to activation of the circuit interrupting sense circuit for preventing the powering of the user load if the testing of the circuit interrupting sense circuit is not successful.

* * * * *